United States Patent
Pallotti et al.

(10) Patent No.: US 6,452,789 B1
(45) Date of Patent: Sep. 17, 2002

(54) PACKAGING ARCHITECTURE FOR 32 PROCESSOR SERVER

(75) Inventors: Lisa Heid Pallotti, Plano; Eric C. Peterson; Christian L Belady, both of McKinney; Terrel L. Morris, Garland; Michael C. Day, Allen, all of TX (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/562,593

(22) Filed: Apr. 29, 2000

(51) Int. Cl.[7] .............................................. G06F 12/00
(52) U.S. Cl. ...................... 361/683; 361/727; 361/788; 395/401; 174/158 R
(58) Field of Search ................................ 361/683, 684, 361/686, 685, 724, 727, 688, 695, 788, 800; 364/708.1, 245.7, 251.7, 259.9; 312/223.1, 223.2, 223.3; 363/141, 144, 147; 710/102; 211/26, 26.2, 41.17; 439/61, 59, 64, 65, 25, 74; 174/261, 158 R, 32; 395/401, 410, 412, 427, 474, 309, 310, 162–166; 701/13; G06F 1/16, 1/24, 15/16

(56) References Cited

U.S. PATENT DOCUMENTS

| | | | | |
|---|---|---|---|---|
| 4,107,760 A | * | 8/1978 | Zimmer ....................... | 361/383 |
| 4,674,004 A | * | 6/1987 | Smith et al. ................. | 361/384 |
| 5,280,591 A | * | 1/1994 | Garcia et al. ............... | 395/325 |
| 5,327,435 A | * | 7/1994 | Warchol .................... | 371/16.1 |
| 5,535,099 A | * | 7/1996 | McCarthy et al. .......... | 361/800 |
| 5,544,008 A | * | 8/1996 | Dimmick et al. ........... | 361/684 |
| 5,634,034 A | * | 5/1997 | Foster ........................ | 395/474 |
| 5,684,671 A | * | 11/1997 | Hobbs et al. ............... | 361/683 |
| 5,822,551 A | * | 10/1998 | Crane et al. ................ | 395/307 |
| 5,822,608 A | * | 10/1998 | Dieffenderfer et al. ..... | 395/800 |
| D402,965 S | * | 12/1998 | Bender ...................... | D13/162 |
| 5,870,572 A | * | 2/1999 | Garcia ........................ | 395/309 |
| 5,940,266 A | * | 8/1999 | Hamilton et al. ........... | 361/695 |
| 5,940,288 A | * | 8/1999 | Kociecki .................... | 363/144 |
| 5,966,301 A | * | 10/1999 | Cook et al. .................. | 364/132 |
| 5,991,163 A | * | 11/1999 | Marconi et al. ............. | 361/788 |
| 6,085,273 A | * | 7/2000 | Ball et al. .................... | 395/309 |
| 6,147,863 A | * | 11/2000 | Moore et al. ................ | 361/686 |
| 6,154,373 A | * | 11/2000 | Durston et al. ............. | 361/788 |
| 6,175,490 B1 | * | 1/2001 | Papa et al. .................. | 361/686 |
| 6,252,791 B1 | * | 6/2001 | Wallace et al. ............... | 365/52 |
| 6,298,289 B1 | * | 10/2001 | Lloyd et al. .................. | 701/13 |

FOREIGN PATENT DOCUMENTS

| | | | | | |
|---|---|---|---|---|---|
| EP | 0598574 A | * | 5/1994 | ........... | G06F/15/16 |
| GB | 2352064 A | * | 1/2001 | ........... | G06F/15/16 |
| GB | 2 354 883 | * | 4/2001 | ........... | H05K/7/14 |
| JP | 409330151 A | * | 12/1997 | ............. | G06F/1/24 |

OTHER PUBLICATIONS

IBM Technical Disclosure Bulletin, Apr. 1994, issue No. 4A, vol. 37, pp. 35–36.*
"SGI Scalable Servers" Datasheet 1999.
"Sun Enterprise 10000 Server" Technical White Paper Sep. 1998.
www.sun.com/servers/highend/10000/spec.html.

* cited by examiner

Primary Examiner—Darren Schuberg
Assistant Examiner—Michael Datskovsky

(57) ABSTRACT

The inventive system uses a backplane to interconnect a plurality of modular cell boards. Each cell board comprises a plurality of processors, a processor controller chip, a memory subsystem, and a power subsystem. The processor controller chip manages communications between components on the cell board. A mechanical subassembly provides support for the cell board, as well as ventilation passages for cooling. Controller chips are connected to one side of the backplane, while the cell boards are connected to the other side. The controller chips manage cell board to cell board communications, and communications between the backplane and the computer system. The cell boards are arranged in back to back pairs, with the outer most cell boards having their components extend beyond the height of the backplane. This allows for an increase of spacing between the front to front interface of adjacent cell boards.

18 Claims, 3 Drawing Sheets

PACKAGING ARCHITECTURE FOR 32 PROCESSOR SERVER

TECHNICAL FIELD

This application is related in general to multi-processor computer systems, and in specific to an arrangement for packaging architecture for multi-processor computer systems.

BACKGROUND

In prior art systems 100, a midplane 101 is used as the backbone for component interconnect, as shown in FIG. 1. A plurality of processor boards 102, memory boards 103, and I/O boards 104 are coupled to the midplane 101. Controller chips 105 handle transporting transactions between the different components. Controller chip 106 manages transactions between system 100 and another system.

This arrangement has several disadvantages. One is the long length the data must traverse in moving between the processor and memory, processor and processor, and between the processor and I/O. For example, for a memory transaction, data must flow from the processor board 102 to the midplane 101, through a series of controller chips 105, and then to the memory board 103. Responses flow back through this path to the processor. The long paths slow the computer system, and are an inefficient use of resources.

The dispersed and shared nature of the various components, 102, 103, 104, does not allow for hot swapping of components. Thus, if one component has malfunctioned, for example a processor board 102, then the entire system must be shut down so that the faulty component can be repaired and/or replaced. Thus, the prior art systems could not meet high availability requirements due to lack of supporting hardware and firmware.

SUMMARY OF THE INVENTION

These and other objects, features and technical advantages are achieved by a system and method which uses a backplane to interconnect a plurality of modular cell boards. The cell board is the building block of the computer system. Each board comprises a plurality of processors, a processor controller subsystem, and a memory subsystem. For example, each board could comprise 4 processors, 1 processor controller chip, and 32 memory DIMMs. The processor controller chip manages communications between components on the cell board. The cell board also comprises a power subsystem, which may be located on a cell board or an a separate board that is connected to the cell board. A mechanical subassembly provides support for the cell board, as well as ventilation passages for cooling.

The controller chips, namely the crossbar chips and the router chips, are connected to one side of the backplane, while the cell boards are connected to the other side. The crossbars chips manage cell board to cell board communications. The router chips manage communications between computer systems located in different cabinets, e.g. the router chips manage communications between backplanes. For example, each backplane could comprise connections for 8 cell boards, 4 crossbar chips, 2 router chips, and three backplane power boards. Note that the power boards enable N+1 power supplying, such that the system would require N power supplies (for example, 2), and the +1 is a redundant power supply that allows for hot swapping power supplies, e.g. in field servicing and replacement. The controller chips are located adjacent to the power boards, such that air cooling is used for the controller chips and the power boards.

The cell boards are arranged in back to back pairs, with the outer most cell boards having their components extend beyond the height of the backplane. This allows for an increase of spacing between the front to front interface of adjacent cell boards. Thus, the backplane board area can be less than the area required to cover the arrangement of cell boards. In other words the footprint of the cell board connectors is smaller than the footprint of the cell board components.

The arrangement of the memory on the cell board reduces the path length, as well as handling chips required, for processor to memory transactions. This results in an increase in system speed.

The interconnection of the components via the backplane uses less physical space, and a reduction in interconnection cables and repeater chips.

The modular arrangement of the components allows for hot swapping (on-line field repair/replacement) of cell boards, power board, and controller chips (on backplane).

The arrangement of components also allows for forced air cooling. The component that require cooling are arranged such that air may be forced in one direction through the cabinet, and thus cool all of the components. This is less hazardous and less expensive than liquid cooling or freon based cooling.

The inventive arrangement has a reliable, hot swappable power system that has optimized distribution paths.

The system uses standard PCB board sizes while allowing the connection of processors that are wider than the boards.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWING

For a more complete understanding of the present invention, and the advantages thereof, reference is now made to the following descriptions taken in conjunction with the accompanying drawing, in which.

DETAILED DESCRIPTION

Figure 2:
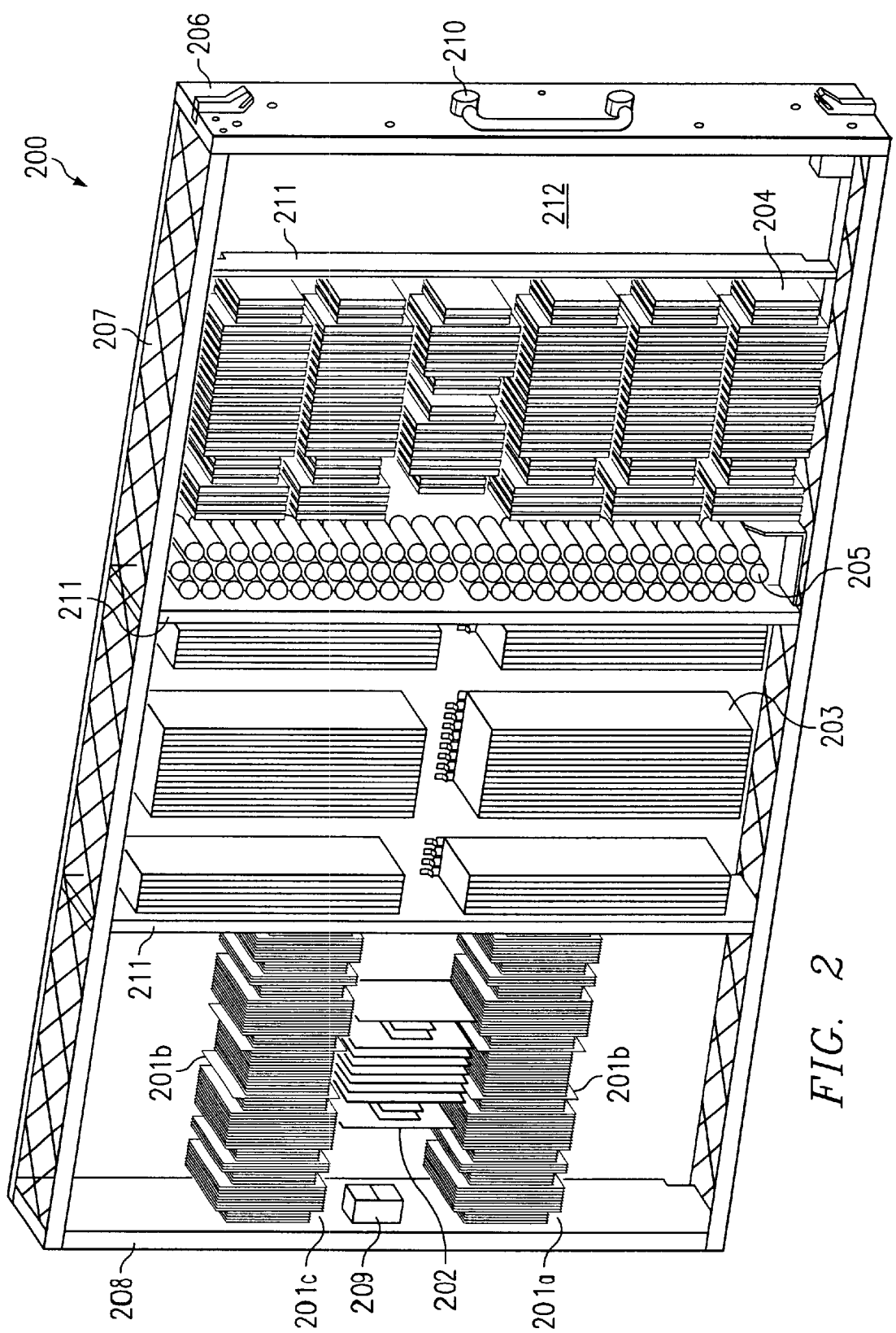
FIG. 2 depicts a block diagram for the inventive cell board.

FIG. 2 depicts a single cell board 200. The cell board comprises a plurality of processors 201a–d. As shown in FIG. 2, the cell board comprises four processors, however this is for illustration only, as fewer processors could be included on the cell board. The cell board also comprises a processor agent subsystem 202, that facilitates communications between the processors, memory subsystem, router chips, crossbar chips, and remote I/O. Note that the remote I/O may be located off the cell board and within the same cabinet of the cell board, or in a different cabinet. As shown in FIG. 2, the cell board comprises one processor agent chip, however this is for illustration only, as more chips could be included on the cell board. The cell board includes point to point wiring net that interconnects its components. The wiring net is within the multiple layers of the board and/or on the surface of the board. The processor agent chip is connected to processors and memory subsystems on the board via the wiring net. For example, a memory request from a processor is passed to the memory subsystem through the processor agent chip. Note that the processor agent is the controller for both the processors and the memory subsystem. This increases the speed of processor-memory transactions. Note that the cell board can be controlled by system firmware, for example the cell board can be independently powered up/down with respect to the remainder of the system.

Support for the cell board is provided by side panels 207, front panel 206, rear panel 208. The cell board may form the bottom with the panels mounting to perimeter of the board, or the cell board may mount to a bottom panel with the side, front, and rear panels connecting to the bottom panel. These structures provide support for the cell board, especially during hot swapping or on-line replacement of the cell board. Thus, the cell board can be disconnected from the backplane without powering down the larger system. Handle 210 assists a user in mounting/dismounting the cell board to the backplane. To prevent board flexing, stiffeners 211 are placed across the board and are coupled to the panels. The cell board could also include expansion space 212, for future expansion of power supplies, processors, or other components of the board.

Connector 209 electrically connects the board to the backplane. This connection provides delivers the power to the power subsystem 204 and signals to the processors, processor agent chip, and memory subsystem, via the wiring net in the cell board. Note that the connector 209 may comprise more than one type of connector. The processor agent chip communicates with router chips, crossbar chips, and remote I/O through the connector.

The cell board 200 includes memory subsystem 203, which comprises a plurality of memory sockets, for example DIMM memory sockets, and controlling logic such as memory controllers, address buffers, etc.

Cell board power is provided to the component of the cell board by power subsystem 204. Capacitors 205 are decoupling capacitors used for reducing low frequency power fluctuation on the power supplied from the power subsystem to the components on the cell board. As stated earlier, the cell board could comprise one or more boards, for example, the processor chips, processor agent chip, and the memory subsystem could comprise one board, while the power subsystem could comprise a second board, and the two boards are interconnected. Using multiple boards allows for a simpler board to be used for power subsystem, and more complex boards (e.g. more layers) to be used for the processors and memory subsystem. The power subsystem includes a plurality of power supplies, which receive the power from the connectors and format the power into power that is useable by the board components. There are N+1 power supplies, with N being the number of supplies required to operate the board, and the +1 is a redundant power supply that provides a backup source of power for the cell board.

In the side panels 207 of the board support are air vents. These vents may be diamond shaped, circular shaped, hexagonal shaped (honeycomb), or other polygon shaped holes. The vents allow for cooling air to be passed into the cell board and across the components. The vents can be angled to direct the air over particular components, e.g. the processors. As shown in FIG. 2, the air could enter the top side panel and exit the bottom side panel or the air could enter the bottom side panel and exit the tops side panel. For additional cooling, components may be fitted with heat sinks, e.g. a heat fin assembly, assist in cooling, e.g. the processors, processor agent chip, and power subsystem. The fins are aligned parallel with the air flow so as to allow the air to flow between the fins. The DIMMs of the memory subsystem are aligned with the air flow to allow the air to pass between the DIMM modules. The DIMMs are located away from the processors, since if fully populated, the DIMMs would cause turbulence that would interrupt the air flow over the processors. Thus, the DIMMSs are not intermixed with the processors.

Figure 3A:
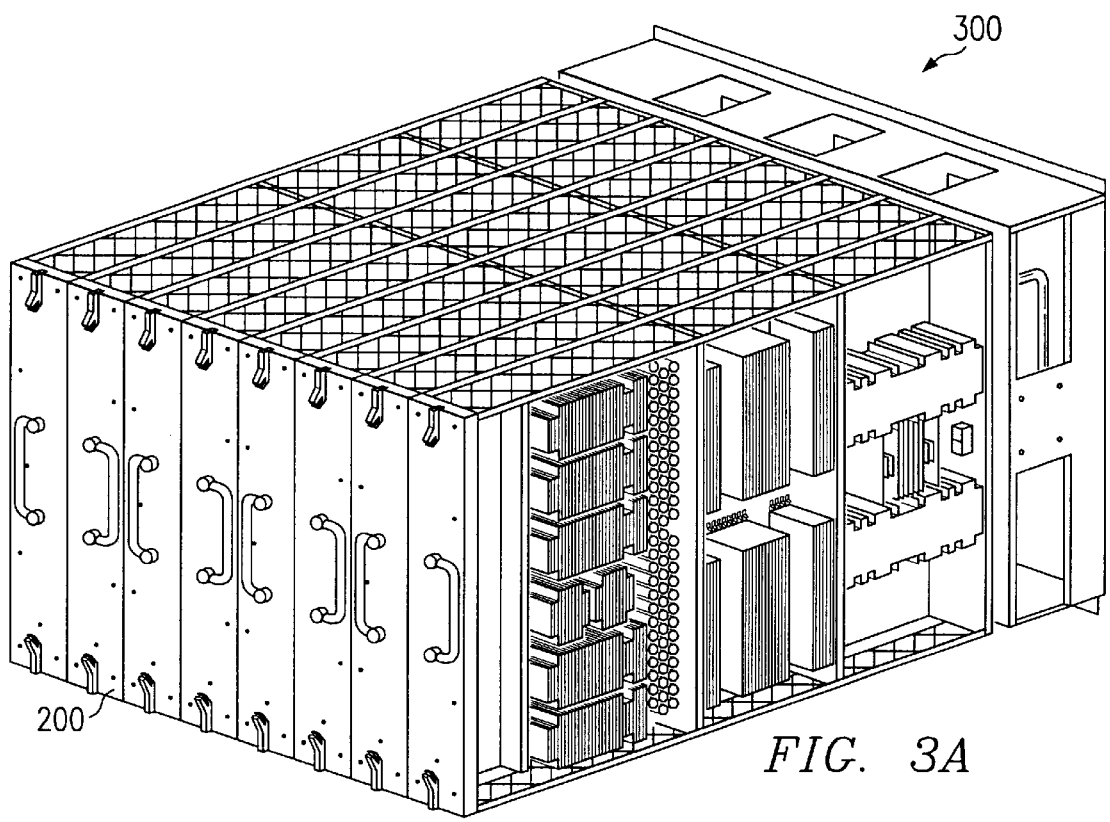
FIGS. 3A and 3B depict eight cell boars of FIG. 2 plugged into the backplane.
Figure 3B:
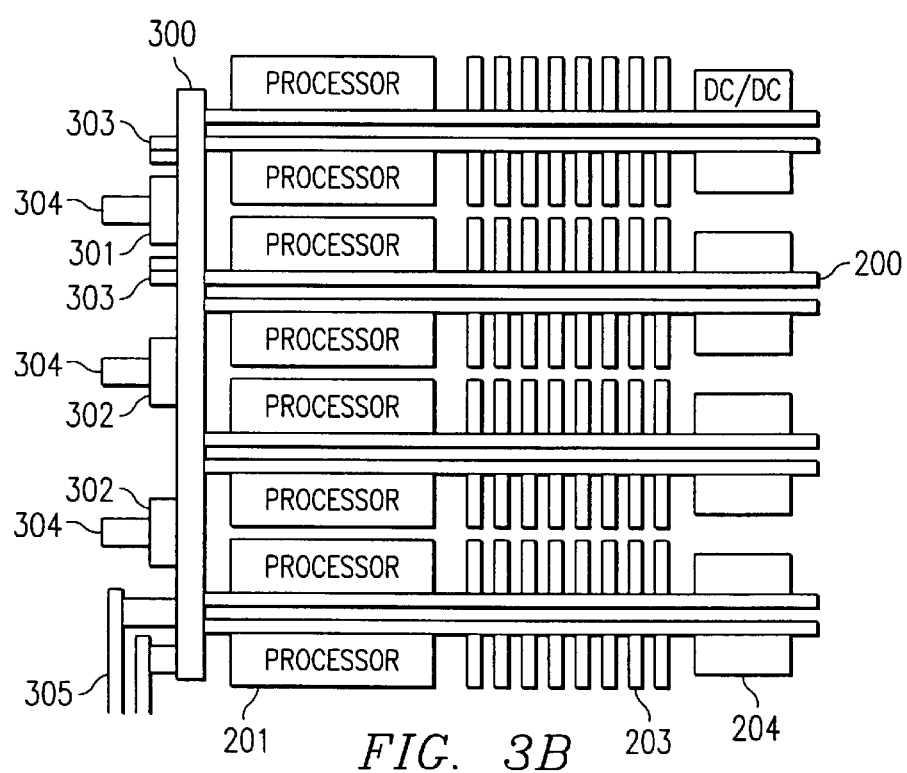

FIG. 3A is a side perspective view of eight cell boards 200 plugged into the backplane 300. As shown in FIG. 3A, Note that eight cell boards as shown in FIG. 3A, however this is for illustration only, as fewer cell boards could be plugged into the backplane. FIG. 3B is a block diagram of FIG. 3A. FIG. 3B depicts the eight cell boards 200 connected with the backplane 300. The cell boards are arranged with two adjacent cells having back to back arrangements or front to front arrangement, but not front to back arrangements. The outer boards are arranged such that their components extend beyond the envelope of the backplane. Thus, a single backplane could be used, even though the footprint of the connecting cell boards is larger than the backplane. Moreover, the additional space between the cell boards with the front to front arrangement can be used to allow additional air flow for cooling and/or for additional height of cell components.

The other side of the backplane includes the power cell boards 304, the router chips 301, the crossbar chips 302, connection points 303, and backplane to backplane connection points (BBC) 305. The BBC connection points allow flexible connection to other backplanes. Two backplanes can be joined through the BBC 305 to make a lower latency path. Alternate cabinet to cabinet connections through the router chips have higher latency, but allow for greater configuration flexibility. A maximum of two backplanes can be joined together through the BBC 305.

Figure 1:
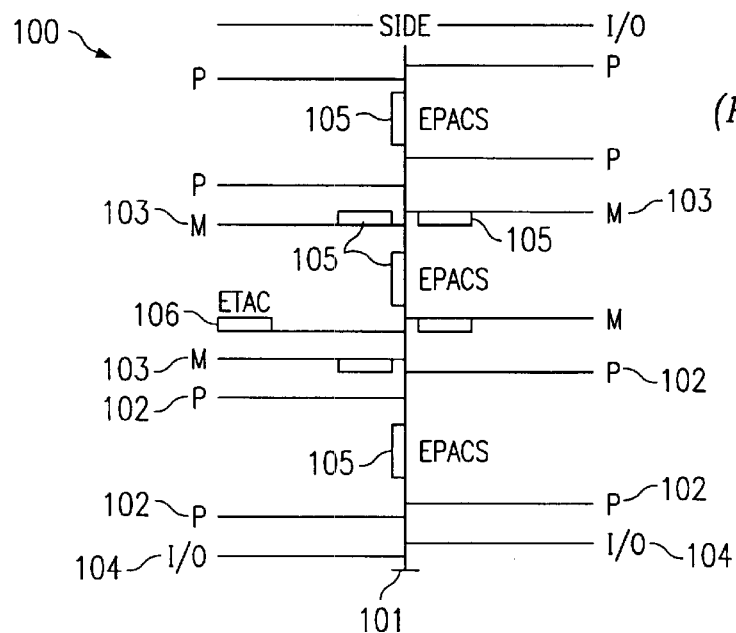
FIG. 1 depicts a block diagram of a prior art system.
Figure 4:
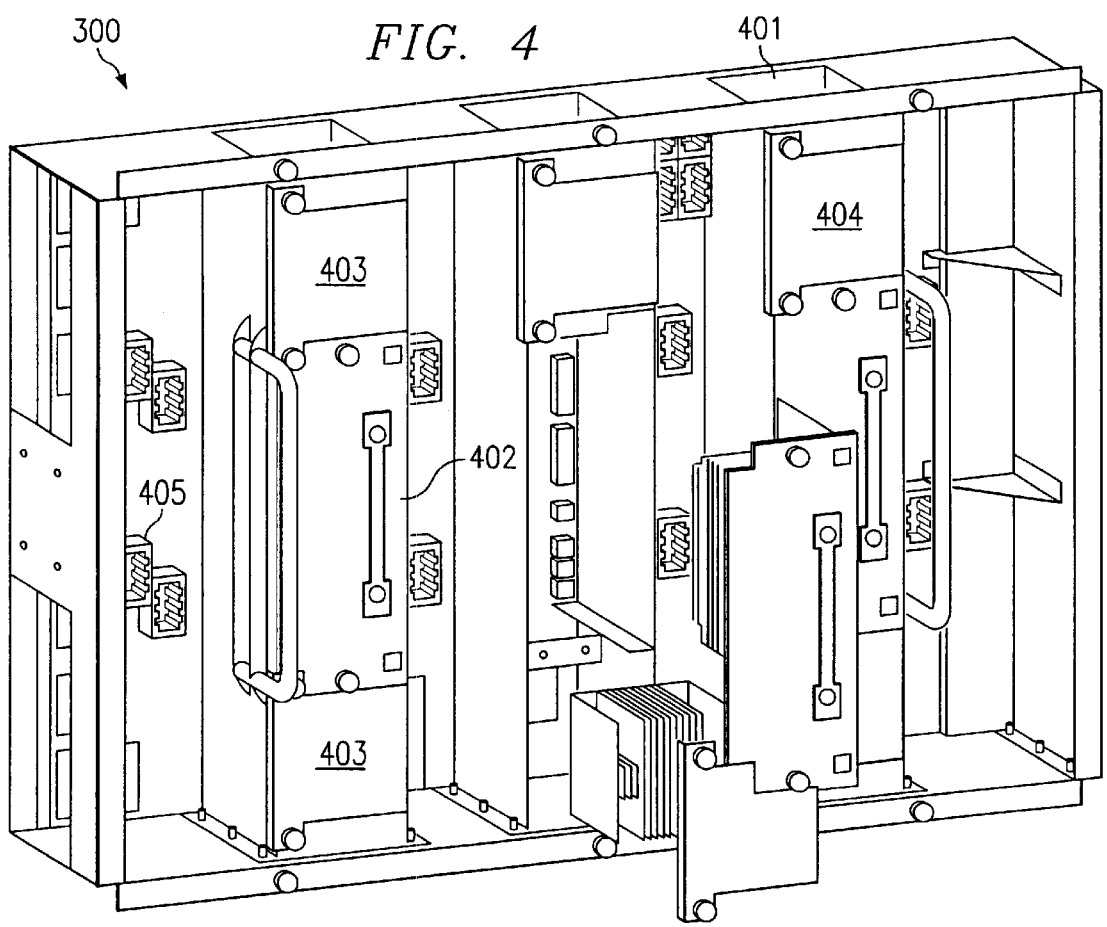
FIG. 4 depicts a perspective view of the backplane.

FIG. 4 depicts a perspective view of the backplane 300. The backplane includes controller chips, e.g. the router chips 403 and the crossbar chips 404. The crossbars chips manage cell board to cell board communications. Thus, communication from one processor on one board to another processor on another board would be from the processor to the processor agent to the cross bar chip to the processor agent on the other board to the processor on the other board. The router chips manage communications between computer systems located in different cabinets, e.g. the router chips manage communications between backplanes. As shown in FIG. 4, the back plane comprises four cross bar chips and two router chips, however this is for illustration only, as more or fewer controller chips could be included on the backplane. The backplane also includes power boards 402. Connectors (not shown) provide coupling locations for connecting wiring to the cell boards. Connectors 405 couple the cells (pass through backplane) to remote I/O (not shown) via cable wiring. Note that the controller chips and the power boards are located in troughs 401. Cooling air would pass through the troughs, but not across the connectors 405 and their respective wires. This concentrates the cooling air where it is needed. This also prevents long term wear on the connectors as their wires would not be vibrating from the air flow. The air flow through the troughs is parallel to the air flow through the cell boards. Thus, the same forced air system for the cell boards could be used for the troughs. Note that there are three power boards, but this is an N+1 arrangement as only two are needed to power the board. Also note that the number of power boards is by way of example only, and more or fewer boards could be used, depending on the needs of the system. The controller chips, and the power boards are also hot swapable.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A multi-processor computer system comprising:
   a plurality of cell boards, wherein each cell board includes:
      a plurality of processors;
      a memory subsystem for storing data for the plurality of processors; and
      a power subsystem for providing power to the plurality of processors and the memory subsystem; and
   a backplane having:
      a first side that connects with the plurality of cell boards; and
      a second side that connects:
         a plurality of power boards for providing power to said power subsystem;
         a plurality of controller devices; and
         a plurality of connectors for connecting wiring to remote I/O.

2. The multi-processor computer system of claim 1 wherein each cell board further includes:
   a processor agent device that controls communication between the plurality of processors and the memory subsystem and between the plurality of processors and the backplane.

3. The multi-processor computer system of claim 1 wherein:
   each cell board has a first side panel that includes a plurality of ventilation holes; and
   each cell board has a second side panel that includes a plurality of ventilation holes;
   wherein the first side panel and the second side panel allow cooling air to flow across the cell board.

4. The multi-processor computer system of claim 3 wherein:
   the plurality of processors and the power subsystem include heat sinks having fins, and the memory subsystem includes a plurality of memory modules; wherein the fins and the memory modules are arrangement to reduce turbulence in the flow of the cooling air.

5. The multi-processor computer system of claim 1 wherein:
   each cell board of the plurality of cell boards may be replaced while the computer system is on-line;
   wherein each cell board includes a handle to facilitate replacement.

6. The multi-processor computer system of claim 3 wherein:
   each cell board of the plurality of cell board has a first side and a second side; and wherein
   the plurality of processors, the memory subsystem, and the power subsystem are connected to the first side.

7. The multi-processor computer system of claim 6 wherein:
   a first cell board is connected to the backplane such that the first side is facing away from the interior of an area formed by the perimeter of the backplane;
   wherein at least one of the plurality of processors, the memory subsystem, and the power subsystem has a height that exceeds the area of the backplane.

8. The multi-processor computer system of claim 7 wherein:
   a second cell board is connected to the backplane such that its second side is adjacent to the second side of the first cell board;
   a third cell board is connected to the backplane such that its first side is adjacent to the first side of the second cell board; and
   a fourth cell board is connected to the backplane such that its second side is adjacent to the second side of the third cell board.

9. The multi-processor computer system of claim 7 wherein:
   the plurality of power boards receive power from the computer system and provide power to each power subsystem of the plurality of cell boards; and
   the plurality of controller devices that control communication between the plurality of processors and the backplane, and between the backplane and the computer system.

10. The multi-processor computer system of claim 9 wherein the backplane further includes:
    at least one air passage that allows cooling air to pass over the plurality of power boards and the plurality of controller devices.

11. A cell board for a multi-processor computer system, wherein the cell board comprises:
    a plurality of processors;
    a memory subsystem for storing data for the plurality of processors;
    a power subsystem for providing power to the plurality of processors and the memory subsystem; and
    wherein the cell board is connected to a first side of a backplane in a computer system and wherein the backplane has a second side that connects:
       a plurality of power boards for providing power to said power subsystem;
       a plurality of controller devices; and
       a plurality of connectors for connecting wiring to remote I/O.

12. The cell board of claim 11 further comprising:
    a processor agent device that controls communication between the plurality of processors and the memory subsystem.

13. The cell board of claim 11 further comprising:
a first side panel that includes a plurality of ventilation holes; and
a second side panel that includes a plurality of ventilation holes;
wherein the first side panel and the second side panel allow cooling air to flow across the cell board.

14. The cell board of claim 13 wherein:
the plurality of processors and the power subsystem include heat sinks having fins, and the memory subsystem includes a plurality of memory modules;
wherein the fins and the memory modules are arrangement to reduce turbulence in the flow of the cooling air.

15. The cell board of claim 11 wherein the cell board may be replaced while the computer system is on-line, the cell board further comprises:
a handle to facilitate replacement.

16. The cell board of claim 13 wherein:
the cell board has a first side; and
the plurality of processors, the memory subsystem, and the power subsystem are connected to the first side.

17. The cell board of claim 11 wherein:
the cell board is one of a plurality of cell boards of the computer system.

18. A multi-processor computer system comprising:
a plurality of cell boards, wherein each cell board includes:
a plurality of processors;
a memory subsystem for storing data for the plurality of processors; and
a power subsystem for providing power to the plurality of processors and the memory subsystem; and
a backplane having:
a first side that connects with the plurality of cell boards,
a plurality of power boards for receiving power from the computer system and providing power to each power subsystem of the plurality of cell boards;
a plurality of controller devices that control communication between the plurality of processors and the backplane, and between the backplane and the computer system; and
a plurality of connectors for connecting wiring to remote I/O;
wherein the plurality of power boards, the plurality of controller devices, and the plurality of connectors are connected to a second side of the backplane;
wherein each cell board has a first side and a second side, with the plurality of processors, the memory subsystem, and the power subsystem are connected to the first side;
wherein a first cell board is connected to the backplane such that the first side is facing away from the interior of an area formed by the perimeter of the backplane, and at least one of the plurality of processors, the memory subsystem, and the power subsystem has a height that exceeds the area of the backplane; and
wherein each cell board has:
a first side panel that includes a plurality of ventilation holes; and
a second side panel that includes a plurality of ventilation holes;
wherein the first side panel and the second side panel allow cooling air to flow across the cell board.

* * * * *

UNITED STATES PATENT AND TRADEMARK OFFICE
CERTIFICATE OF CORRECTION

PATENT NO.     : 6,452,789 B1
DATED          : September 17, 2002
INVENTOR(S)    : Lisa Heid Pallotti et al.

It is certified that error appears in the above-identified patent and that said Letters Patent is hereby corrected as shown below:

Column 2,
Line 54, delete "board" and insert therefor -- boards --

Column 7,
Line 12, delete "arrangement" and insert therefor -- arranged --

Signed and Sealed this

Fourth Day of January, 2005

JON W. DUDAS
*Director of the United States Patent and Trademark Office*